United States Patent
Arnan et al.

(10) Patent No.: US 7,363,453 B1
(45) Date of Patent: Apr. 22, 2008

(54) METHOD AND APPARATUS FOR IMPROVING STORAGE DEVICE PERFORMANCE BY SELECTIVE VOLUME SWAPPING BASED ON HOT SPOT ANALYSIS

(75) Inventors: Ron Arnan, Brookline, MA (US); Tao Kai Lam, Somerville, MA (US); Hui Wang, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 689 days.

(21) Appl. No.: 10/998,491

(22) Filed: Nov. 29, 2004

(51) Int. Cl.
*G06F 12/02* (2006.01)

(52) U.S. Cl. .............................. 711/170; 707/2; 710/18

(58) Field of Classification Search ................ 711/170; 710/18; 707/2
See application file for complete search history.

(56) References Cited

U.S. PATENT DOCUMENTS

| | | | |
|---|---|---|---|
| 6,189,071 B1 | 2/2001 | Bachmat | |
| 6,341,333 B1 | 1/2002 | Schreiber et al. | |
| 6,405,282 B1 | 6/2002 | Lam et al. | |
| 6,415,372 B1 | 7/2002 | Zakai et al. | |
| 6,442,650 B1 | 8/2002 | Bachmat et al. | |
| 6,480,930 B1 | 11/2002 | Zakai et al. | |
| 6,557,074 B1 | 4/2003 | Michel et al. | |
| 6,584,545 B2 | 6/2003 | Bachmat et al. | |
| 6,601,133 B2 | 7/2003 | Zakai et al. | |
| 6,611,896 B1 | 8/2003 | Mason, Jr. et al. ......... 711/114 |
| 6,614,616 B1 | 9/2003 | Michel et al. ........... 360/78.04 |
| 6,622,221 B1 | 9/2003 | Zahavi ...................... 711/154 |
| 6,664,964 B1 | 12/2003 | Levin-Michael et al. | |
| 6,665,771 B1 | 12/2003 | Michel et al. | |
| 6,671,774 B1 | 12/2003 | Lam et al. | |
| 6,675,274 B1 * | 1/2004 | Lam et al. ................... 711/170 |
| 6,694,405 B2 | 2/2004 | Lam et al. | |
| 6,711,649 B1 | 3/2004 | Bachmat et al. | |
| 6,715,039 B1 | 3/2004 | Michael et al. ............. 711/133 |
| 6,721,870 B1 | 4/2004 | Yochai et al. ............... 711/204 |
| 6,728,840 B1 | 4/2004 | Shatil et al. ................. 711/137 |
| 6,804,733 B1 | 10/2004 | Michel et al. | |
| 6,836,800 B1 * | 12/2004 | Sweet et al. ................ 709/224 |
| 2002/0133671 A1 * | 9/2002 | Obara et al. ................ 711/114 |
| 2005/0240743 A1 * | 10/2005 | Eng et al. .................... 711/167 |

* cited by examiner

*Primary Examiner*—Donald Sparks
*Assistant Examiner*—Jared I Rutz
(74) *Attorney, Agent, or Firm*—BainwoodHuang (57) ABSTRACT

An optimizer process in a storage system automatically selects access activity data for storage devices in the system during periods of interest so that a volume-swapping optimization analysis is based on desired device performance information and thus yields improved optimization results. For each of a number of sampling intervals in an analysis period, workload statistics are collected for logical volumes in the system. From the workload statistics, a service time is calculated for each storage device for each sampling interval. A set of highest service times is identified from the service times for each device, such as those above the 80th percentile, and a service time measure is generated from the set of highest service times. Devices having the highest and lowest measures are identified, and a pair of volumes is identified that, if swapped between the two devices, would improve the service time measure of the higher-service-time device without unduly degrading the service time measure of the lower-service-time device. Such volumes are subsequently swapped, improving the performance of the higher-service-time device and the overall system.

24 Claims, 3 Drawing Sheets

METHOD AND APPARATUS FOR IMPROVING STORAGE DEVICE PERFORMANCE BY SELECTIVE VOLUME SWAPPING BASED ON HOT SPOT ANALYSIS

BACKGROUND

The present invention is related to the field of data storage systems.

The performance of data storage systems typically depends in part on the arrangement or configuration of the stored data. For example, data items that are heavily utilized are often distributed among multiple storage devices in the system to avoid "bottlenecks", i.e., devices that have long service times because of the quantity of requests they receive. System performance is generally improved when different file systems and databases that receive heavy concurrent use are stored on different storage devices within the system.

There are known techniques for improving storage system performance by selectively moving stored data within a system in a manner calculated to reduce the service times provided by devices within the system. In one such technique, statistical data is collected regarding the I/O accesses to logical volumes stored on disk drives within a storage system. This data is aggregated over many sub-intervals to obtain a measure of average access activity for each storage device within the system over a measurement interval that may span several days or longer. A pair of candidate disk drives and one or more pairs of potentially exchangeable logical volumes are then identified, and further processing is performed to determine whether the access activity of the disk drives can be improved by exchanging the logical volumes of one or more of the pairs between the two drives, i.e., by moving each volume of the pair from its present disk drive to the other disk drive. In particular, it is determined whether the access activity of a more heavily loaded disk drive will be reduced, and the access activity of a less heavily loaded disk drive will not be increased unduly, if the exchange of logical volumes is performed. If so, a swap operation is performed to actually carry out the exchange. This process can also be run on a single candidate disk drive where the exchanging of logical volume occurs on that single disk and is determined by whether the access activity of the disk drive will be reduced. This process is repeated at periodic measurement intervals to enable the system to continuously adjust to changing workloads and other factors affecting the pattern of disk activity.

In the above-described technique, access activity data for the entire measurement interval is included in the calculations of the access activity measures, and therefore the average access activity measure is an overall average for the measurement interval. In one variation, intermediate intervals denoted "performance time windows" can be utilized to restrict the periods of access activity data used for calculation. For example, if the periods of 9 AM to 6 PM of normal workdays are designated as "performance time windows", then only data from such periods is analyzed. Device performance during other, non-critical periods is effectively ignored by the optimization process. The technique automatically arrives at an access activity measure for each disk drive that is based only on data accesses occurring during the performance time windows, and thus each measure more accurately reflects the performance of the corresponding disk drive when it is deemed to matter most.

Whether used with performance time windows or not, the above-described technique utilizes all of the access activity data that has been obtained in the relevant period. If performance time windows are not used, then for each device the average of all the access times over all the sub-intervals of the measurement period is calculated and utilized in selecting candidate disk drives for swapping volumes. When performance time windows are used, then the average of all the access times over the sub-intervals of the performance time window(s) is used. A technique which is similar to that described above is provided in U.S. Pat. No. 6,711,649 to Bachmat et al. entitled "Load Balancing on Disk Array Storage Device."

SUMMARY

Although the above-described conventional technique can improve data storage system performance, and the use of performance time windows can enhance this improvement, there are operational situations in which the technique may still not yield a desired level of performance that a system may be capable of attaining. For example, it may be that some devices within the system are busy at one time, and other devices are busy at another time, and so it is not possible to specify a single performance time window that will yield the desired data for all devices. Alternatively, the periods of high access activity of some or all devices may not come at predictable times, but rather may come at variable times that are determined by events outside the storage system. Thus, no fixed performance time window can be specified that will yield the desired access activity data. More generally, the above-described technique employs an average of all the access activity data collected during the relevant period, whether this is the entire measurement interval or a performance time window. It therefore cannot distinguish between devices experiencing moderate but steady activity over the period and devices experiencing generally lower activity with sporadic periods of much higher activity in the same period. Accordingly, the performance improvement from the process may be correspondingly limited.

In accordance with the present invention, a method of operating a data storage system is disclosed that automatically selects access activity data during periods of interest regardless of their uniformity or regularity, so that a subsequent volume-swapping analysis can be based on the desired performance information and therefore yield better optimization results.

For each of a number of sampling intervals in an analysis period, workload statistics are collected for the logical volumes in a storage system. For each storage device, a service time is calculated for each sampling interval from the workload statistics of the logical volumes stored on the device. Each service time is an estimate of the total time needed to service all requests for data stored on the corresponding storage device during the corresponding sampling interval.

Then, for each of the storage devices, a set of highest service times is identified from the service times computed over the sampling intervals, and a service time measure is generated from the set of highest service times. In one embodiment, the set of highest service times are those above the 80th percentile of all service times over the analysis period. The service time measure thus reflects the performance of the storage device during the periods of highest service times whenever they occur, rather than reflecting average performance over an entire measurement interval or over a predetermined performance time window. These periods of highest service times are referred to herein as "hot spots".

The hot-spot-based service time measures of the storage devices are used to identify storage devices whose performance may be improved by swapping logical volumes, generally among multiple devices. For example, the storage devices can be ranked by hot-spot service time measures, and a pair of devices having the highest and lowest measures can be selected. An analysis is performed to find a pair of volumes that, if swapped between the two devices, would improve (i.e., reduce) the service time measure of the higher-ranked device without unduly degrading (i.e. increasing) the service time measure of the lower-ranked device. When such volumes are identified, they are duly swapped to improve the performance of the higher-ranked device and thereby improve system performance.

In one embodiment, the criteria for selecting the highest service times to be used in computing the service time measures is a fixed value, such as the 80th percentile mentioned above. In alternative embodiments, this selection criteria may be user-selectable in some fashion, enabling a system manager to tune the operation of the optimization process to particular workloads experienced by the storage system.

BRIEF DESCRIPTION OF THE SEVERAL VIEWS OF THE DRAWING

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

The entirety of the disclosure of U.S. Pat. No. 6,711,649 to Bachmat et al. entitled "Load Balancing on Disk Array Storage Device," is incorporated by reference herein.

Figure 1:
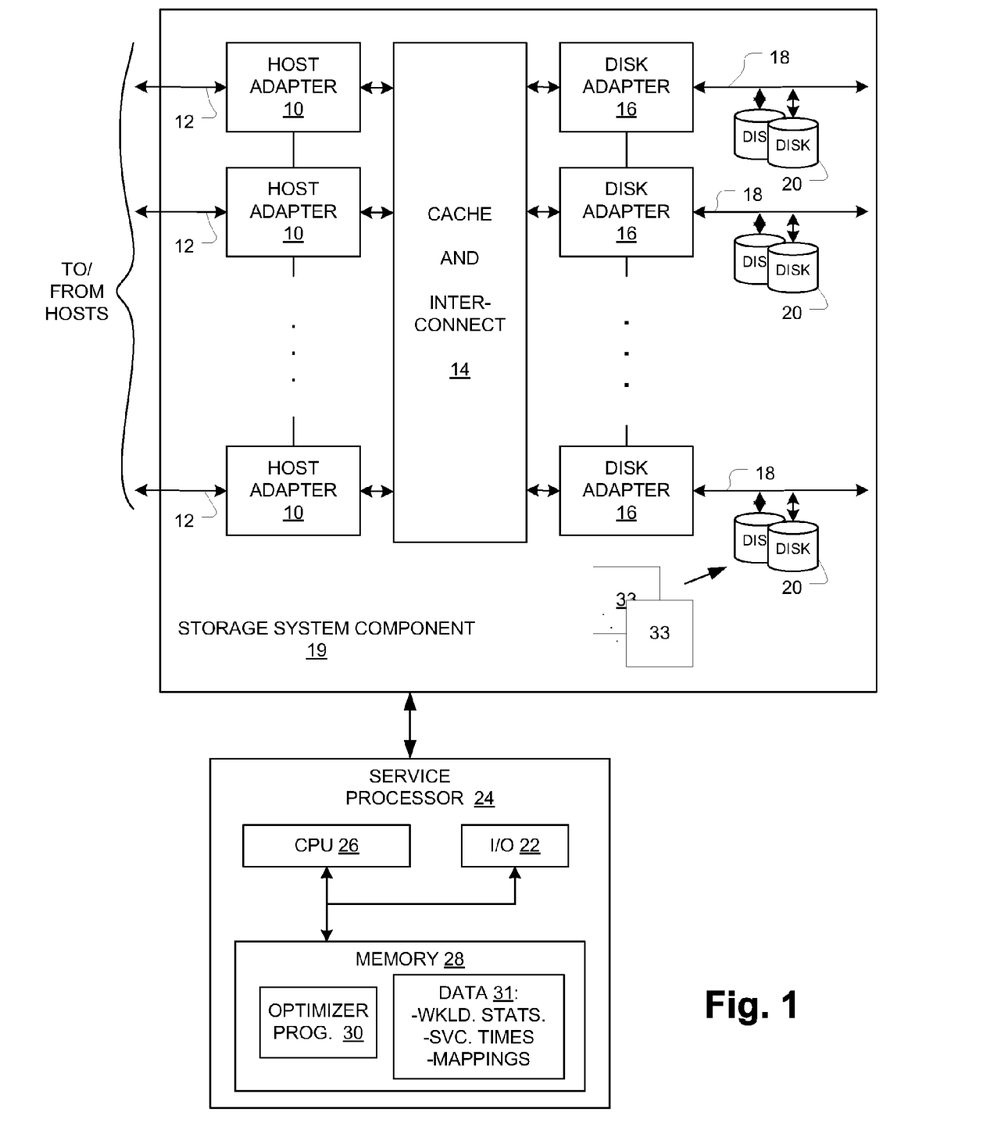
FIG. 1 is a block diagram of a data storage system including a service processor having an optimizer program for performing hot spot analysis in accordance with the present invention.

FIG. 1 shows a data storage system for storing data for a number of host computers (or simply hosts). The host computers are coupled to respective host adapters 10 via respective interconnect buses 12, such as Fiber Channel or other high-speed storage interconnect buses. The host adapters 10 are coupled to cache and interconnect block 14, which in turn is coupled to disk adapters 16. Each disk adapter 16 interfaces to one or more storage buses 18 to which a plurality of storage devices 20 (e.g., disk drives) are connected. The storage buses 18 may be Small Computer System Interconnect (SCSI) buses for example.

In the illustrated embodiment, the above-described components are part of a storage system component 19 that may include a distinct physical housing. An example of such a storage system component is a Symmetrix® storage system sold by EMC Corporation.

The storage system component 19 has an interface to an input/output portion 22 of a service processor 24, which may be for example a personal computer or similar device. The service processor 24 includes a central processor (CPU) 26 and a memory 28. The memory 28 stores an optimizer program 30, which is typically loaded from external storage (not shown in FIG. 1) and executed as an optimizer process by the CPU 26. The memory 28 also stores various data 31, including workload statistics and service times that are calculated as part of the optimizer process, and a mapping of logical volumes to physical storage devices. The nature and use of these data are described below. The interface between the storage system component 19 and the service processor 24 permits the service processor 24 to communicate with the host adapters 10 and the disk adapters 16 for a variety of purposes, including gathering workload statistics and swapping logical volumes among the disk drives 20 as described below.

During operation, the host adapters 10 respond to storage requests from the hosts by determining whether the requests can be satisfied from a large cache memory within the cache and interconnect block 14. In the case of host read requests for data found in the cache memory (referred to as "read hits"), the data is read from the cache memory and returned to the requesting host. In the case of host write requests, the data is written into the cache memory and is provided to an appropriate disk adapter 16 to be stored on one or more of the storage devices 20 as determined by a storage address associated with the data. In the case of host read requests for data not found in the cache memory (referred to as "read misses"), an appropriate disk adapter 16 retrieves the data from one of the storage devices 20 (as determined by the storage address), stores the data in the cache memory, and supplies the data to the host adapter 10 from which the request originated. The requesting host adapter 10 returns the data to the requesting host.

The above operations generally proceed without any involvement of the service processor 24. The service processor 24 is an ancillary device for use in configuring and managing the various resources within the storage system, especially the storage devices 20 and the data stored thereon. In particular, the optimizer program 30 of the service processor 24 is used to analyze operation of the storage system and to determine whether it is possible to reconfigure the pattern of data storage on the storage devices 20 to improve system performance by reducing the time required to access data, referred to as "service time". The operation of the optimizer program 30 within the data storage system is described in detail below.

Generally, modern storage systems employ data organization constructs referred to as "logical volumes", which are units of storage that are visible to the hosts via the host adapters 10. A set of logical volumes is shown at 33 in FIG. 1. Among other attributes, a logical volume 33 has a size as represented by a range of addresses. A host to which a logical volume 33 is allocated performs input/output (I/O) operations to the logical volume 33 as though it were a distinct physical storage device. The data associated with logical volumes 33 is stored in corresponding areas of the physical storage devices 20, and the storage system maintains a map or translation structure that associates each logical volume 33 with areas on one or more storage devices 20 where data for the logical volume 33 is stored. Examples of these mappings are shown below.

In some cases, a logical volume 33 has a one-to-one mapping to an area of a single storage device 20. When data protection in the form of parity or replication is provided, a given logical volume 33 may be associated with a set of storage areas of multiple storage devices 20. At any given moment, there is a mapping of all logical volumes 33 to corresponding storage devices where the logical volume 33 data are stored. Viewed another way, this mapping also describes, for each storage device 20, the set of logical volumes 33 that are currently stored on it. The logical-to-physical mapping is generally useful for carrying out host read and write requests based on logical volume identifiers accompanying the requests. The reverse (physical-to-logical) mapping assists the optimizer program 30 in associating volume-based workload statistics with individual storage devices 20, as described in more detail below. As mentioned above, a data structure representing these mappings is contained within the data 31 of the service processor 24. A simplified example of these two mappings is given in the Tables 1 and 2 below:

TABLE 1

Logical-to-Physical Mapping

| Logical Volume | Disk Device |
|---|---|
| 1 | 1 |
| 2 | 2 |
| 3 | 1 |
| 4 | 3 |
| 5 | 2 |
| ... | ... |
| $L_i$ | $D_j$ |

TABLE 2

Physical-to-Logical Mapping

| Disk Device | Logical Volumes |
|---|---|
| 1 | 1, 3, ... |
| 2 | 2, 5, ... |
| 3 | 4, ... |
| ... | ... |
| $D_j$ | $\{L_i\}$ |

Figure 2:
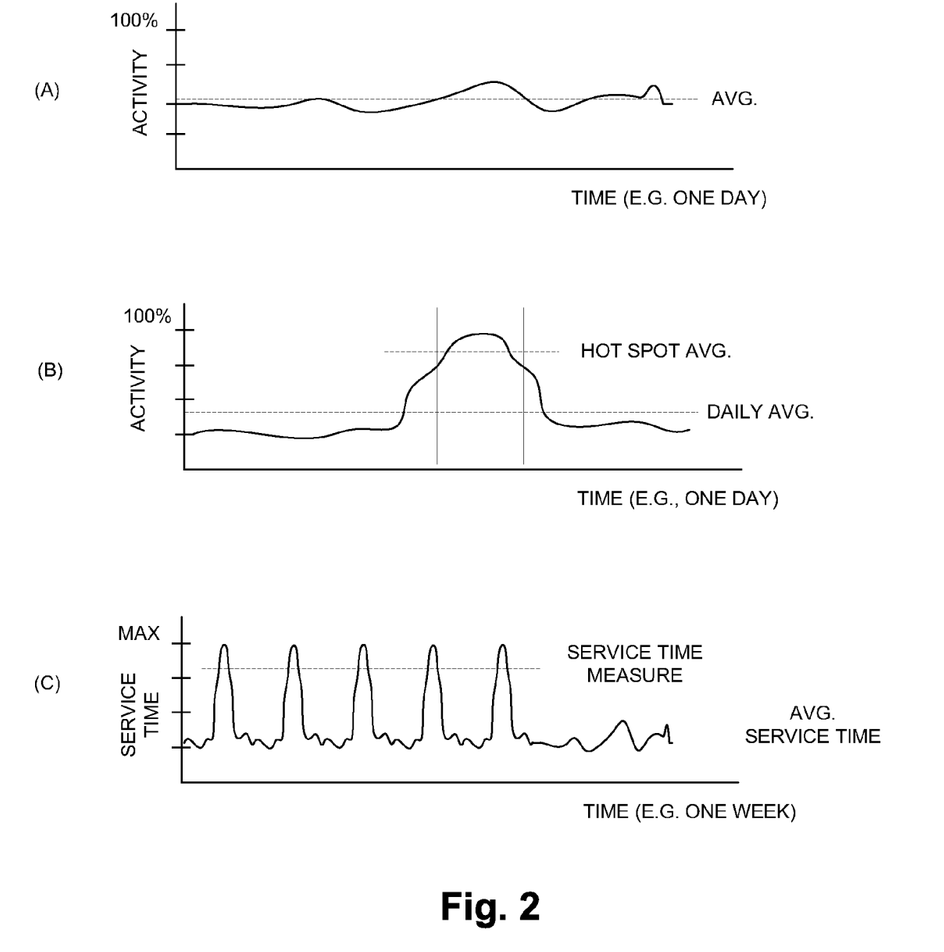
FIG. 2 shows plots of hypothetical disk activity profiles demonstrating the difference between an overall average service time and a hot spot average service time.

FIG. 2 shows patterns of storage device activity as they pertain to the presently disclosed optimizing technique. In FIG. 2(A), the activity of a device is shown as being fairly constant over a given time interval, which may be for example one day. In the illustrated example, the device is approximately 50% busy throughout the day. This activity profile may be generally representative of a typical departmental mail server, for example.

FIG. 2(B) shows activity that is relatively low except during one period in which the activity is markedly higher. This higher-activity period is an example of a "hot spot". In the illustrated example, the overall average activity of the device is on the order of 40%. However, during the hot spot period its peak activity is 100%, and its average activity is on the order of 75%. This kind of activity profile may be representative of a device used with an application having sporadic periods of relatively high storage demand.

FIG. 2(C) shows an activity profile such as that of FIG. 2(B) but over a longer period, such as one week for example, where the peak periods may occur during the five workdays.

It should be noted that the higher-activity periods of FIGS. 2(B) and 2(C) may not occur at predictable times. The disclosed optimization technique automatically gives due consideration to the higher-activity periods regardless of their number or timing, as described below.

Figure 3:
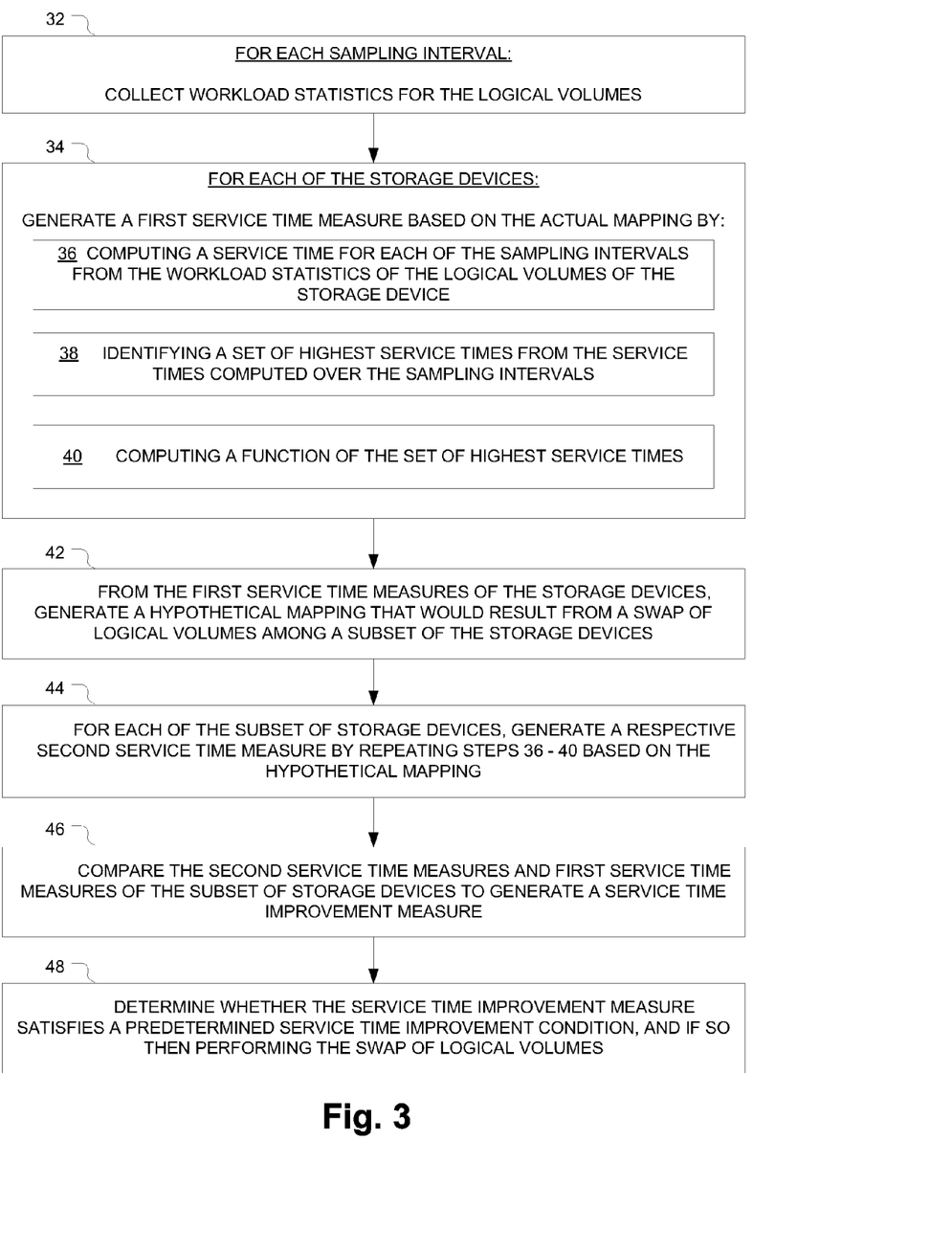
FIG. 3 is a flow diagram of an optimizer process for performing hot spot analysis carried out by the service processor and optimizer program of FIG. 1.

FIG. 3 depicts the optimization process as performed in the storage system of FIG. 1 by the service processor 24 (executing the optimization program 30) in conjunction with the disk adapters 16. That is, the CPU 26 runs the optimizer program 30 stored in the memory 28 to perform the optimization process of FIG. 3.

The service processor 24 performs step 32 for each of a number of relatively short "sampling intervals" over a much longer analysis period. For example, the sampling interval may be 10-15 minutes, whereas a typical analysis period over which statistics are gathered and analyzed may be on the order of one week. It is generally preferred that the sampling interval be as short as possible to yield accurate sample values. However, it will be appreciated that the processing load increases as the sampling interval is made shorter, so a balance must be struck between sample accuracy and computational tractability. For example, the length of the interval may be the smallest interval for which the service processor 24 can perform the required statistics collection and related processing in real time.

In step 32, the service processor 24 collects statistics regarding the workload of the storage devices 20 on a per-logical-volume basis. These workload statistics are stored as part of the data 31 in the memory 28 of the service processor 24. Due to the presence of the cache memory in the cache and interconnect block 14, the workload experienced by the storage devices 20 is generally different from the workload presented by the hosts. Host read requests that hit in the cache, for example, do not result in requests to the storage devices 20. On the other hand, the cache generates pre-fetches of data from the storage devices 20 that may never be used to satisfy a host read request. Thus, the specific workload of the storage devices 20 that is monitored includes the following transactions:

Host Read Misses
Host Writes
Prefetches

For each logical volume 33 that is involved in one of the above transactions during a sampling interval, the disk adapters 16 record (1) the number of such transactions, and (2) the size (i.e. the amount of data transferred) of each transaction. For all other logical volumes, a transaction count of zero is recorded. This statistics-collection process is repeated during each sampling interval.

The service processor 24 then performs step 34 to generate a first "service time measure" for each of the storage devices 20 based on the actual present mapping of logical volumes 33 to physical storage devices 20. Step 34 includes steps 36-40 as shown. In step 36, the service processor 24 uses the workload statistics to calculate a total "service time" for each of the storage devices 20. The calculated service times are also stored as part of the data 31 in the memory 28 of the service processor 24. The computation of service times employs a model that reflects three primary components of delay or service time in reading or writing data to/from a disk drive: seek time, rotational delay, and data transfer time. The average rotational delay experienced for each transaction is estimated at $\frac{1}{3}$ of the disk revolution period. The data transfer time is a function of the size of the data transfer, the bit density and revolution rate of the disk. These factors are applied to each transaction to arrive at a transfer time for the transaction. The transfer time is added to the rotational delay for each transaction. Then, for each storage device 20, the summed values for all transactions involving any of the logical volumes on that device are added together. The result represents the total rotational delay and transfer time for the storage device 20 over the sampling interval.

Seek time is calculated using a model that incorporates a set of predetermined seek time constants for each pair of logical volumes 33 on each storage device 20. Each seek time constant represents the time required for a seek when an access to one logical volume of the pair is followed by an access to the other logical volume of the pair. The set of seek time constants can be obtained from the manufacturer of the storage device 20, or they can be obtained empirically. The seek time constants are combined with a set of weighted transaction counts for each volume, where the weighting reflects differences among the transaction types from a device loading perspective. For example, prefetches and writes are usually more sequential in nature than read-misses, and therefore result in fewer seeks. Thus, read-misses are weighted more heavily than writes and prefetches. In one weighting scheme, the weighted transaction count for a logical volume over a sampling interval is calculated as the sum of (read misses)+½(writes)+¼(prefetches).

The total seek time for a given storage device 20 over a sampling interval is then calculated (in accordance with one model) as follows:

$$T(\text{seek})=(\text{SUM}(T_{ij}*A_i*A_j))/(\text{SUM}(A_k))$$

where the SUM in the numerator is over all pairs of logical volumes i and j, $T_{ij}$ is the predetermined seek time constant for the pair of logical volumes i and j, and $A_i$ and $A_j$ are the weighted transaction counts for same pair of logical volumes. The SUM in the denominator is the sum of all weighted transaction counts for all the logical volumes 33 on the storage device 20.

For each storage device 20, the value T(seek) is added to the values obtained for total rotational delay and data transfer time to arrive at the service time for the storage device 20 for the sampling interval.

Referring again to FIG. 3, at step 38 the service processor 24 uses the service times for the storage device over all the sampling intervals of the analysis period to identify a set of highest service times for each storage device. As an example, the service times at or above the 80th percentile may be selected (i.e. the highest 20% of the service times). This process can be understood with reference to FIG. 2(C). The service times generally track the disk activity depicted therein, i.e., the service times tend to be low during periods of low activity and high during periods of higher activity (the hot spots). Thus, in the profile of FIG. 2(C), the 80th percentile service times are distributed over five hot-spot periods that are spaced apart in time.

In step 40 of the process of FIG. 3, the service processor 24 uses the highest service times for each storage device 20 to generate the service time measure for the device. In one embodiment, this first service time measure may be calculated as the average of the highest service time values. Other functions may be used to generate the service time measure. For example, the value of the 80th percentile service time may simply be chosen, this value demarcating the boundary between the highest service time values and the remaining service time values. It will be observed that for the profile of FIG. 2(C), the average of the highest service times is substantially greater than the average service time over the entire analysis period, which is shown as AVG SERVICE TIME. FIG. 2(C) thus demonstrates how the presently disclosed technique can generate a greater service time measure for sporadically used storage devices 20 than would be yielded by a technique that computes an average based on the service times from all of the sampling intervals of the analysis period. This higher service time measure results in a higher ranking for the storage device 20 in a subsequent step described below, which increases its likelihood of participating in a swap to reduce its peak service times and thereby improve performance of the data storage system.

As noted above, in one embodiment the 80th percentile value separates the highest service times from the remainder of the service times for purposes of identifying those service times that will be used to calculate a service time measure. Other ways of identifying the service times of interest may be used in alternative embodiments. The selection of the service times to be used in any particular embodiment may be influenced by a variety of factors. When service times from more sampling intervals are included, the resulting service time measure tends to be closer to the overall average service time. Thus, if a very low separating value is used (e.g. 50th percentile or smaller), storage devices experiencing a reasonably sporadic workload may not be treated much differently from devices experiencing a very steady workload. If the separating value is too high (e.g. 95th percentile or higher), the optimization process may become too sensitive to "outlier" service times, i.e., a relatively small number of high service times that might not accurately reflect the overall operation of the system or individual storage devices 20. The selection criteria should be chosen so that the optimization process responds as desired to the set of workloads (sporadic and steady) experienced by the storage devices 20. The exact nature of the workloads, and therefore the appropriate selection criteria, is necessarily dependent on the nature of the usage of the host computers in any operating environment, among other things.

Additionally, the criteria for selecting the service times of interest may be user-selectable rather than fixed. For example, the optimizer process may be able to receive a percentile value from a user that is used to separate the highest service times from the remainder. Such an approach can provide a way to tune the optimization process to a particular system environment. Additionally, it may be desirable in some systems to employ multiple selection criteria, each used under different operating circumstances. The definition and use of such multiple criteria can be established by a system manager and provided to the optimizer program 30.

Referring again to FIG. 3, in step 42 the service processor 24 uses the first service time measures for the various storage devices 20 to generate a hypothetical mapping of the logical volumes 33 to the storage devices 20 that would result from a swap of logical volumes among a subset of the storage devices 20. In one embodiment, this step entails identifying first and second devices 20 having respective high and low service time measures. For example, the devices 20 may be ranked according to their first service time measures, and the devices having the highest and lowest first service time measures may be selected. The goal of this selection process is to identify "hot" and "cold" devices (i.e., devices having respective high and low service time measures) for which a swap of logical volumes 33 may improve overall performance. Additionally, the service processor 24 selects specific logical volumes 33 for potential swapping between the hot and cold devices 20. In one approach, the logical volumes 33 on each device are ranked according to their weighted transaction counts, and the logical volume 33 with the highest count on the hot device is paired with the logical volume 33 having the lowest count on the cold device. Thus, in such an embodiment, the resulting hypothetical mapping is the same as the actual present mapping of logical volumes 33 to storage devices 20, except that the highest-count logical volume 33 on the hot storage device 20 is swapped with the lowest-count logical volume 33 on the cold storage device 20.

In step 44, the service processor 24 generates second service time measures for the hot and cold devices 20 by repeating steps 36 to 40 based on the hypothetical mapping generated in step 42. It will be appreciated that the second service time measures reflect the performance of the subset of devices 20 that would be expected if the swap of the selected logical volumes were actually performed.

In step 46, the first and second service time measures (STMs) of the subset of devices 20 are compared in order to generate a service time improvement measure. In the above-described embodiment in which the highest-ranked (hottest) and lowest-ranked (coldest) devices 20 are selected, this comparison entails the following calculations:

1. Calculate the difference between the second and first STMs of the hot device
2. Calculate the difference between the second STM of the cold device and the first STM of the hot device The service time improvement measure thus includes both of the calculated difference values.

In step 48, the service time improvement measure is compared with a predetermined service time improvement condition to ascertain whether the performance of the storage system is likely to improve if the swap of the identified logical volumes 33 is performed. This will generally include a reduction of service time measure for at least one of the selected subset of storage devices 20. In the above embodiment in which the hottest and coldest devices 20 are selected, this service time improvement condition may be that the service time of the hottest device decreases while the service time of the coldest device remains at or below the first service time measure of the hot device. Stated another way, the differences calculated in step 46 above must both be negative.

If the service time improvement condition is satisfied, then the logical volumes 33 that have been selected for swapping are duly swapped. Techniques for performing such swaps are known in the art. One conventional technique involves performing the swap while normal operation of the storage system continues, so the hosts do not experience any disruption in their operation. A similar technique is described in the above-referenced U.S. Pat. No. 6,711,649. If the service time improvement conditions are not met, the process repeats with a different pair of hot and cold disk drives until the conditions are met or until a predetermined length of time has expired.

For the hypothetical mapping generated in step 42, it may be sufficient to identify only one candidate pair of volumes residing on respective storage devices 20, or it may be desirable to identify more candidate pairs if they exist. Additionally, there may be some volume pairs that are not swappable for various reasons, for example volumes of different sizes. There may be other limitations on swapping as well, such as a customer-imposed or system-imposed directive that certain logical volumes 33 are not to be moved, or the need to maintain separation between copies of volumes in certain RAID configurations. Any such limitations must of course be observed in selecting candidate logical volumes 33 for swapping.

Additionally, in alternative embodiments it may be desirable to include some number other than two of the storage devices 20 in the subset of storage devices 20 among which the swap of logical volumes 33 is to be considered, and/or to employ criteria other than the hottest/coldest criteria for selecting which storage devices 20 are to be included in the subset. For example, if it is concluded that the performance of a hot device cannot be improved by swapping a logical volume with another device, then an analysis can be performed to determine if swapping logical volumes on only the hot device (i.e., moving logical volumes from place to place on the same device) will improve the device's performance, and if so then the swap can be performed. As a further option, such an "intra-device" swap may be either automatic or user-enabled.

Those skilled in the art will appreciate that embodiments and variations of the present invention other than those explicitly disclosed herein are possible. It is to be understood that modifications to the methods and apparatus disclosed herein are possible while still achieving the objectives of the invention, and such modifications and variations are within the scope of this invention. Accordingly, the scope of the present invention is not to be limited by the foregoing description of embodiments of the invention, but rather only by the claims appearing below.

What is claimed is:

1. A method of operating a storage system having storage devices on which logical volumes are stored according to an actual mapping, comprising:

for each of a plurality of sampling intervals, collecting workload statistics for each of the logical volumes;

for each of the storage devices, generating a respective first service time measure based on the actual mapping by (i) computing a service time for each of the sampling intervals from the workload statistics of the logical volumes of the storage device, (ii) identifying a set of highest service times from the service times computed over the sampling intervals, the set of highest service times not including all of the computed service times and (iii) computing a function of the set of highest service times;

from the first service time measures of the storage devices, generating a hypothetical mapping that would result from a swap of logical volumes among a subset of the storage devices;

for each of the subset of storage devices, generating a respective second service time measure by repeating steps (i)-(iii) based on the hypothetical mapping;

comparing the second service time measures and first service time measures of the subset of storage devices to generate a service time improvement measure; and determining whether the service time improvement measure satisfies a predetermined service time improvement condition, and if so then performing the swap of logical volumes.

2. A method according to claim 1, wherein identifying the set of highest service times comprises selecting the highest n of the service times, n representing a predetermined proportion between substantially five percent and substantially fifty percent.

3. A method according to claim 2, wherein n is substantially twenty percent.

4. A method according to claim 2, further comprising receiving a user input specifying the value of n.

5. A method according to claim 1, wherein generating the hypothetical mapping comprises:

ranking the storage devices of the storage system by their respective first service time measures; and selecting the highest-ranked and lowest-ranked storage devices as the subset of the storage devices.

6. A method according to claim 1, wherein generating the hypothetical mapping comprises selecting two logical volumes stored on a single device as candidates for swapping.

7. A method according to claim 1, wherein computing the function of the set of highest service times comprises computing an average of the set of highest service times.

8. A method according to claim 1, wherein the sampling interval is substantially the smallest sampling interval for which the method can be executed by a service processor in the storage system in real time.

9. A method according to claim 1, wherein the sampling interval is in the range of 10-15 minutes.

10. A method according to claim 1, wherein:

the storage system includes a cache memory operative to generate read-miss transactions, read-prefetch transactions, and write transactions;

the workload statistics include respective transaction counts of read-miss transactions, read-prefetch transactions and write transactions for each sampling interval for each of the logical volumes; and computing a service time comprises (i) applying the transaction counts to a service time model from which estimations for seek time, latency and data transfer are generated based on the transaction counts, and (ii) combining the estimations for seek time, latency and data transfer.

11. A method according to claim 1, wherein:

the subset of storage devices includes a first storage device having a relatively high first service time measure and a second storage device having a relatively low first service time measure;

the service time improvement measure comprises (i) a first difference between the second service time measure and the first service time measure of the first storage device, and (ii) a second difference between the second service time measure of the second device and the first service time measure of the first device; and the service time improvement condition comprises both the first and second differences being negative.

12. A service processor comprising a processor, memory and an input/output interface, the input/output interface being coupleable to a set of device controllers of a storage system having storage devices on which logical volumes are stored according to an actual mapping, the memory being operative to store an optimizer program executable by the processor, the processor being operative when executing the optimizer program to perform an optimizer process comprising:

for each of a plurality of sampling intervals, collecting workload statistics for each of the logical volumes, for each of the storage devices, generating a respective first service time measure based on the actual mapping by (i) computing a service time for each of the sampling intervals from the workload statistics of the logical volumes of the storage device, (ii) identifying a set of highest service times from the service times computed over the sampling intervals, the set of highest service times not including all of the computed service times and (iii) computing a function of the set of highest service times;

from the first service time measures of the storage devices, generating a hypothetical mapping that would result from a swap of logical volumes among a subset of the storage devices;

for each of the subset of storage devices, generating a respective second service time measure by repeating steps (i)-(iii) based on the hypothetical mapping;

comparing the second service time measures and first service time measures of the subset of storage devices to generate a service time improvement measure; and determining whether the service time improvement measure satisfies a predetermined service time improvement condition, and if so then performing the swap of logical volumes.

13. A service processor according to claim 12, wherein identifying the set of highest service times comprises selecting the highest n of the service times, n representing a predetermined proportion between substantially five percent and substantially fifty percent.

14. A service processor according to claim 13, wherein n is substantially twenty percent.

15. A service processor according to claim 14, wherein the optimizer process further comprises receiving a user input specifying the value of n.

16. A service processor according to claim 12, wherein generating the hypothetical mapping comprises:

ranking the storage devices of the storage system by their respective first service time measures; and selecting the highest-ranked and lowest-ranked storage devices as the subset of the storage devices.

17. A service processor according to claim 12, wherein generating the hypothetical mapping comprises selecting two logical volumes stored on a single device as candidates for swapping.

18. A service processor according to claim 12, wherein computing the function of the set of highest service times comprises computing an average of the set of highest service times.

19. A service processor according to claim 12, wherein the sampling interval is substantially the smallest sampling interval for which the method can be executed by the service processor in real time.

20. A service processor according to claim 12, wherein the sampling interval is in the range of 10-15 minutes.

21. A service processor according to claim 12, wherein:

the storage system includes a cache memory operative to generate read-miss transactions, read-prefetch transactions, and write transactions;

the workload statistics include respective transaction counts of read-miss transactions, read-prefetch transactions and write transactions for each sampling interval for each of the logical volumes; and computing a service time comprises (i) applying the transaction counts to a service time model from which estimations for seek time, latency and data transfer are generated based on the transaction counts, and (ii) combining the estimations for seek time, latency and data transfer.

22. A service processor according to claim 12, wherein:

the subset of storage devices includes a first storage device having a relatively high first service time measure and a second storage device having a relatively low first service time measure;

the service time improvement measure comprises (i) a first difference between the second service time measure and the first service time measure of the first storage device, and (ii) a second difference between the second service time measure of the second device and the first service time measure of the first device; and the service time improvement condition comprises both the first and second differences being negative.

23. A storage system, comprising:

a plurality of storage devices on which logical volumes are stored according to an actual mapping;

a set of device controllers operative to:
- (A) collect workload statistics for the logical volumes for each of a plurality of sampling intervals; and
- (B) copy logical volumes among the storage devices as part of swap operations; and a service processor operative:
- (A) for each of the storage devices, to generate a respective first service time measure based on the actual mapping by (i) computing a service time for each of the sampling intervals from the workload statistics of the logical volumes of the storage device, (ii) identifying a set of highest service times from the service times computed over the sampling intervals, the set of highest service times not including all of the computed service times and (iii) computing a function of the set of highest service times;
- (B) from the first service time measures of the storage devices, to generate a hypothetical mapping that would result from a swap of logical volumes among a subset of the storage devices;
- (C) for each of the subset of storage devices, to generate a respective second service time measure by repeating steps (i)-(iii) based on the hypothetical mapping;
- (D) to compare the second service time measures and first service time measures of the subset of storage devices to generate a service time improvement measure; and
- (E) to determine whether the service time improvement measure satisfies a predetermined service time improvement condition, and if so then instruct the device controllers to perform the swap of logical volumes.

24. A computer program storage medium on which an optimizer program is stored, the optimizer program being operative when executed by a processor in a storage system to carry out an optimizer process comprising:

for each of a plurality of sampling intervals, collecting workload statistics for each of a plurality of logical volumes stored on storage devices in the storage system according to an actual mapping;

for each of the storage devices, generating a respective first service time measure based on the actual mapping by (i) computing a service time for each of the sampling intervals from the workload statistics of the logical volumes of the storage device, (ii) identifying a set of highest service times from the service times computed over the sampling intervals, the set of highest service times not including all of the computed service times and (iii) computing a function of the set of highest service times;

from the first service time measures of the storage devices, generating a hypothetical mapping that would result from a swap of logical volumes among a subset of the storage devices;

for each of the subset of storage devices, generating a respective second service time measure by repeating steps (i)-(iii) based on the hypothetical mapping;

comparing the second service time measures and first service time measures of the subset of storage devices to generate a service time improvement measure; and determining whether the service time improvement measure satisfies a predetermined service time improvement condition, and if so then performing the swap of logical volumes.

* * * * *